(12) United States Patent
Iwasaki et al.

(10) Patent No.: US 8,763,792 B2
(45) Date of Patent: Jul. 1, 2014

(54) CONVEYANCE SYSTEM

(71) Applicant: Murata Machinery, Ltd., Kyoto (JP)

(72) Inventors: Kazuya Iwasaki, Inuyama (JP); Kazuhiro Ishikawa, Inuyama (JP)

(73) Assignee: Murata Machinery, Ltd., Kyoto (JP)

(*) Notice: Subject to any disclaimer, the term of this patent is extended or adjusted under 35 U.S.C. 154(b) by 0 days.

(21) Appl. No.: 13/865,228

(22) Filed: Apr. 18, 2013

(65) Prior Publication Data

US 2013/0228415 A1  Sep. 5, 2013

Related U.S. Application Data

(63) Continuation of application No. PCT/JP2011/071999, filed on Sep. 27, 2011.

(30) Foreign Application Priority Data

Oct. 26, 2010  (JP) .................................. 2010-239418

(51) Int. Cl.
*B65G 23/04*  (2006.01)

(52) U.S. Cl.
USPC ..... 198/846; 198/343.2; 198/800; 198/860.2; 198/339.1; 198/831

(58) Field of Classification Search
CPC ...................................................... B23P 23/02
USPC ............................ 198/831, 832, 346.2, 339.1
See application file for complete search history.

(56) References Cited

U.S. PATENT DOCUMENTS

| | | | |
|---|---|---|---|
| 2,684,753 A * | 7/1954 | Kolbe et al. .................... | 198/805 |
| 5,887,430 A | 3/1999 | Hirai et al. | |
| 6,816,754 B2 | 11/2004 | Mukai et al. | |
| 2003/0216833 A1 | 11/2003 | Mukai et al. | |

FOREIGN PATENT DOCUMENTS

| | | |
|---|---|---|
| JP | 02-310211 A | 12/1990 |
| JP | 04-283039 A | 10/1992 |
| JP | 05-192842 A | 8/1993 |
| JP | 07-040266 A | 2/1995 |
| JP | 11-122716 A | 4/1999 |
| JP | 2001-274597 A | 10/2001 |

(Continued)

OTHER PUBLICATIONS

English translation of Official Communication issued in corresponding International Application PCT/JP2011/071999, mailed on May 23, 2013.

(Continued)

*Primary Examiner* — Ramya Burgess
*Assistant Examiner* — Lester Rushin
(74) *Attorney, Agent, or Firm* — Keating & Bennett, LLP

(57) ABSTRACT

A conveyance system includes a traveling member to transport an article installed for movement along a travel guide. A drive source arranged to drive the traveling member is a linear motor including an armature, disposed along the travel guide, and a mover on the secondary side installed on the traveling member. The travel guide includes a rectilinear section and a curved section. The armatures of the linear motor are spaced at a distance from each other and arranged such that a plurality of the armatures are arranged along the rectilinear section and the curved section of the travel guide. The travel guide is arranged to accommodate a plurality of traveling members mounted thereon.

11 Claims, 15 Drawing Sheets

(56) References Cited

FOREIGN PATENT DOCUMENTS

| JP | 2002-118906 A | | 4/2002 | |
| JP | 2003-340758 A | | 12/2003 | |
| JP | 2004-114175 | * | 4/2004 | ............. B23P 23/02 |
| JP | 2004-114175 A | | 4/2004 | |
| JP | 2007-082307 A | | 3/2007 | |
| JP | 2010-149269 A | | 7/2010 | |

OTHER PUBLICATIONS

Official Communication issued in International Patent Application No. PCT/JP2011/071999, mailed on Dec. 6, 2011.

Official Communication issued in corresponding European Patent Application No. 11835978.5, mailed on Mar. 5, 2014.

* cited by examiner

CONVEYANCE SYSTEM

CROSS REFERENCE TO THE RELATED APPLICATION

This application is a continuation application, under 35 U.S.C §111(a) of international application No. PCT/JP2011/071999, filed Sep. 27, 2011, which claims Convention priority to Japanese patent application No. 2010-239418, filed Oct. 26, 2010, the entire disclosure of which is herein incorporated by reference as a part of this application.

BACKGROUND OF THE INVENTION

1. Field of the Invention

The present invention relates to a conveyance system for use in conveying articles in a machine tool loader, an industrial machinery or a physical distributing machine and, more particularly, to a conveyance system including at least one curved section in the path of conveyance.

2. Description of the Related Art

As a conveyance system for delivering or discharging workpieces in or from a machine tool such as, for example, a lathe or turning machine, the type has been well known, which includes a lifter, mounted on a traveling member movable along a guide rail, and a chuck provided in a loader head at a lower end of the lifter to hold a workpiece. In this type of the conveyance system, the traveling member moves along a linear transport path. It has, however, been determined that only with the linear transport path, an installation space for a machine tool is limited and it is difficult to make the efficient utilization of the floor space available in a factory. Because of this, suggestions have been made to include at least one curved section in the transport path such as disclosed in, for example, JP Laid-open Patent Publication No. 04-283039 and JP Laid-open Patent Publication No. 2010-149269. Also, even in the industrial machinery, a similar suggestion has been made to include a curved section in the transport path.

In addition, a linear motor has been employed in, for example, a conveyor carriage employed in a physical distributing apparatus. While the linear motor is available in various types such as, for example, a linear induction motor (LIM), a linear synchronous motor (LSM) and a linear direct current motor, the linear induction motor is largely employed in a long distance conveyance system. A main stream of this linear synchronous motor is of a type including magnets, installed on the ground side, and a coil side installed movably.

The example, such as disclosed in the JP Laid-open Patent Publication No. 2007-82307, has been suggested in which primary coils of the linear synchronous motor system are partially discretely arranged on the ground side in, for example, a curved section or sections proximate to opposite ends of the transport path where acceleration and deceleration are required. However, the linear synchronous motor system utilized in such a case is merely utilized in an auxiliary manner at the curved section or such sections proximate to the opposite ends of the transport path, and the linear induction motor is mainly utilized even in such a case.

PRIOR ART LITERATURE

[Patent Document 1] JP Laid-open Patent Publication No. 04-283039
[Patent Document 2] JP Laid-open Patent Publication No. 2010-149269
[Patent Document 3] JP Laid-open Patent Publication No. 2007-82307

According to the prior art conveyance systems discussed hereinabove, even though they make use of the curved section in the transport path, the curved section is merely utilized for transportation and nothing has been practiced to dispose, for example, a transfer equipment or a machine tool at the curved section. This is because at the curved section, the positioning accuracy of the traveling member is generally so low that the transfer of the workpiece cannot be accomplished assuredly and/or the transfer of the article, which results in a proper posture of the article and/or a proper grasping position of the article, cannot be accomplished.

Also, in the conventionally standard conveyance system, a servomotor of a rotary type and a rotation-to-direct motion conversion mechanism defined by a rack and a pinion are generally employed as a drive mechanism and, therefore, it is difficult to increase the positioning accuracy. Although some systems employ a linear induction motor, the linear induction motor has a thrust so low that it is difficult to increase the traveling performance and also to accomplish a positioning with high accuracy. Accordingly, most of the prior art linear synchronous motors are of a type in which the magnets are arranged on the ground side and the coil side is movable. However, in order to move the coil side, supply of an electric power to a mover such as a needle, a magnet array, or a movable coil is required and, hence, in view of the necessity of wiring lines, it is impossible to accomplish an endless transport path so that the transport path tends to be limited, and also, the power feeding system tends to become complicated. The case in which the primary coil is disposed on the ground side is a mere disposition of the primary coil on the ground side in a localized area such as, for example, the curved section and/or the opposite ends of the transport path where acceleration and deceleration are required, such as disclosed in, for example, JP Laid-open Patent Publication No. 2007-82307.

SUMMARY OF THE INVENTION

Preferred embodiments of the present invention provide a conveyance system capable of allowing a traveling member to precisely move along a curved section of the transport path via a travel guide and also to halt the traveling member at a position in the curved section.

A preferred embodiment of the present invention provides a conveyance system of a kind in which a traveling member to transport an article is installed to move along a travel guide. A drive source to drive the traveling member to move is defined by a linear motor. This linear motor includes a plurality of independent armatures on a primary side, arranged along the travel guide, and a mover on a secondary side installed on the traveling member. The travel guide includes at least a curved section. The traveling member referred to above is arranged to move along the curved section.

According to the structural features described above, the traveling member can be moved precisely and the halting position can be determined even at the curved section because use is made of the linear motor including the armatures arranged along the travel guide and the mover on the secondary side installed on the traveling member during driving the traveling member. By way of example, as compared with the conventional conveyance system of a kind utilizing a rotary type motor and a rotation-to-direct motion conversion mechanism, the traveling member can be moved precisely and the halting position can be determined. Also, since the linear motor which will define the primary side is disposed in the ground side, the electric power supply system can be simplified.

Each of the armatures of the linear motor is preferably arranged at a distance from each other. In particular, the armatures are preferably arranged over the entire travel path of the traveling member, having been spaced at a distance from each other. With the armatures arranged in a spaced manner, that is, with the armature arranged in a discrete spaced pattern, the amount of coils used can be reduced and the cost can therefore be reduced. Driving of the armatures is possible even though the armatures are arranged discretely, and, in the case of the conveyance system, the discrete positioning of the armatures is proper in terms of precision and cost.

In the conveyance system of the foregoing construction, the traveling member referred to above may be used to deliver the article to an article delivery destination positioned in the travel guide. Alternatively, the traveling member referred to above may be used to deliver the article onto a machine tool disposed along the travel guide. As discussed above, since halting positioning of the traveling member can be accomplished precisely, even at the curved section, the article can be assuredly delivered to the article delivery destination, particularly onto the machine tool and, also, the attitude of the article, and the grasping position when delivering can be accomplished properly. Also, by using the curved section of the transport path for delivery and receipt of the article, limitations on the disposition of various machines and equipments within the premises of a factory can be relieved and the limited floor space in the factory can be utilized efficiently. It is to be noted that the term "machine tool" referred to in the description of the preferred embodiments of the present invention above and hereinafter is not necessarily limited to a narrowly defined machine tool such as, for example, a lathe or the like capable of performing a mechanical processing such as, for example, a cutting process or the like, but is to be understood as including a broadly defined machine tool including, for example, a punch press and a sheet metal processing machine such as, for example, a laser processing machine.

The armatures on the primary side referred to above are preferably arranged in a plural number along the curved section of the travel guide. Disposition of the plurality of the armatures on the primary side even in at the curved section makes it possible to accomplish a precise travel and a halt positioning of the traveling member even at the curved section.

In a preferred embodiment of the present invention, the traveling member may include a holding unit to hold the article and a moving mechanism to move the holding unit in a direction different from a traveling direction of the traveling member, in which case the conveyance system further includes a non-contact power feeding device arranged to feed an electric power receiving unit on a non-contact basis, provided in the traveling member, from an electric power supplying unit, provided along the travel guide, and an electrically operated drive source serving as a drive source for the holding unit and the moving mechanism, with the traveling member being connected with the electric power receiving unit.

Transport of the workpiece relative to the machine tool requires positioning in various directions in concomitance to destinations of delivery of articles such as, for example, main shafts of the machine tools and, also, requires a holding unit to hold the workpiece. Because of this, even though the drive is performed by the linear motor provided with the mover on the secondary side in the traveling member and the use of any cable wiring in the traveling member for the purpose of a travel drive is dispensed with, an electric power supply to the moving mechanism and the holding unit is essentially required. In view of this, in the construction of a preferred embodiment of the present invention, since the electric power supply to the moving mechanism and also to the holding unit is accomplished through the non-contact power feeding device, it is possible to eliminate any cables to supply an electric power between the traveling member and the ground, and as a result, a free arrangement of the transport path is enabled. In the case of this construction, all of the drive sources mounted on the traveling member are of an electrically operated type to eliminate the necessity of use of pneumatic piping.

In the case of this construction, the traveling member may include a wireless communicating unit mounted thereon and a command transmitting unit also mounted on thereon to control the drive source for the holding unit and the moving mechanism in response to a signal communicated by the wireless communicating unit. When not only the non-contact power feeding but also signal transmission and receipt for the control by way of the wireless communicating unit are performed, the need to use any wiring between the traveling member and the ground, including a system of transmitting the control command, can be eliminated. Because of this, the transport path can be further freely arranged.

In another preferred embodiment of the present invention, the mover on the secondary side may be a permanent magnet having N and S magnetic poles alternately arranged in a direction conforming with the traveling direction, in which case the conveyance system further includes a magnetic pole sensor provided in the traveling member to detect the magnetic pole of the mover or the magnetic pole of a magnet provided in the traveling member in the same array as magnetic poles of the mover, and a travel control unit to perform a travel control of the traveling member with the use of a detection signal of the magnetic pole sensor. Where the magnetic pole sensor is used to detect the magnetic poles of the mover linearly, no magnet used for detection purposes is employed.

When the linear motor of the type discussed above is controlled by the use of the magnetic pole sensor referred to above, an even more precise positioning control can be accomplished and it is possible to accomplish a highly precise positioning even at the curved section. Because of this, the delivery and receipt of the article at the curved section can be accomplished more assuredly and at an even more proper angle. It is to be noted that the control for the purpose of the position feedback may make use of a position signal, obtained from a signal of the magnetic pole sensor, or may make use of a signal of a position sensor separate from the magnetic pole sensor. The control by the magnetic pole sensor is rendered to be, for example, a control in accordance with an electric current feedback system.

The present invention in accordance with another preferred embodiment thereof provides a conveyance system which includes a traveling member, installed to permit movement along a travel guide, to transport an article; and a drive source, defined by a linear motor, to drive the traveling member to move, in which case the linear motor includes a plurality of independent armatures on a primary side arranged along the travel guide and a mover on a secondary side installed on the traveling member. The travel guide is of a type capable of accommodating a plurality of traveling members mounted thereon.

The drive source arranged to drive the traveling member to move is defined by the linear motor including the plurality of independent armatures on the primary side and the mover on the secondary side mounted on the traveling member, and, therefore, unlike the conventional use of the rotary type motor mounted on the traveling member, the armatures on the primary side can be commonly used in the plurality of the movers. Also, it is sufficient to merely provide the traveling member with the permanent magnet and, hence, the number of the traveling members can be increased with a simplified structure. By properly controlling the armatures, the plurality of the movers can be moved simultaneously.

Any combination of at least two constructions of preferred embodiments of the present invention is included within the scope of the present invention.

The above and other elements, features, steps, characteristics and advantages of the present invention will become more apparent from the following detailed description of the preferred embodiments with reference to the attached drawings.

DESCRIPTION OF THE PREFERRED EMBODIMENTS

Figure 1:
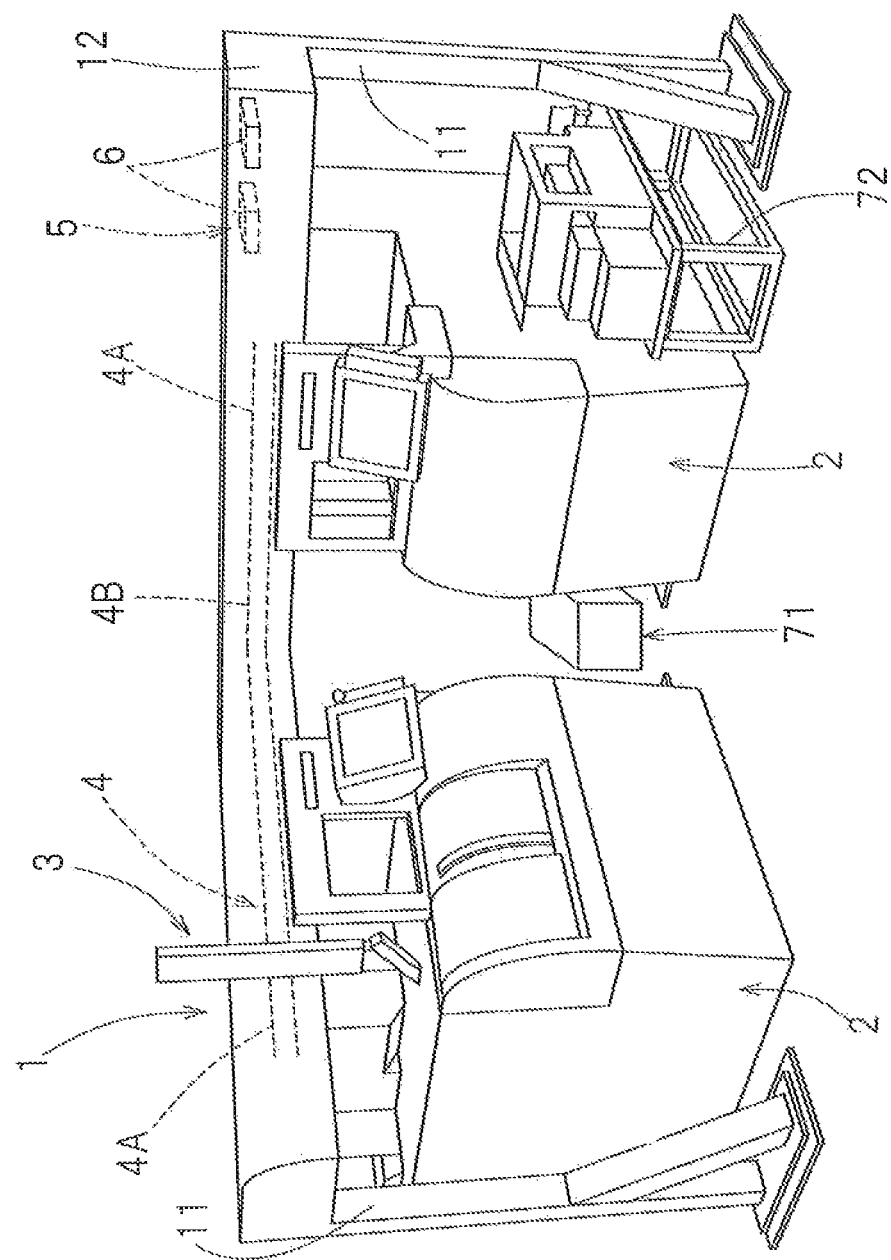
FIG. 1 is a perspective view showing a processing facility including a combination of a machine tool with a conveyance system in accordance with a first preferred embodiment of the present invention.

A first preferred embodiment of the present invention will be described in detail with particular reference to FIGS. 1 to 17. In particular, FIG. 1 illustrates a perspective view of a processing facility including a transport apparatus 1 defining a principal component of the conveyance system, machine tools 2, and transfer tables 71 and 72. Preferably, two machine tools 2 are provided in the single transport apparatus 1 according to the present preferred embodiment. The transport apparatus 1 is preferably of a type in which a traveling member 3 to transport an article is installed for movement along a travel guide 4, and the travel guide 4 referred to includes a rectilinear section 4A and a curved section 4B. One of the transfer tables, for example, the transfer table 71 is installed adjacent the curved section 4B. This transfer table 71 preferably serves the purpose of delivering and receiving a workpiece or work W, which may be either a raw material or a product, relative to the outside of the conveyance system, and through this transfer table 71, the delivering or discharging of the work W is carried out by way of the traveling member 3.

Figure 2:
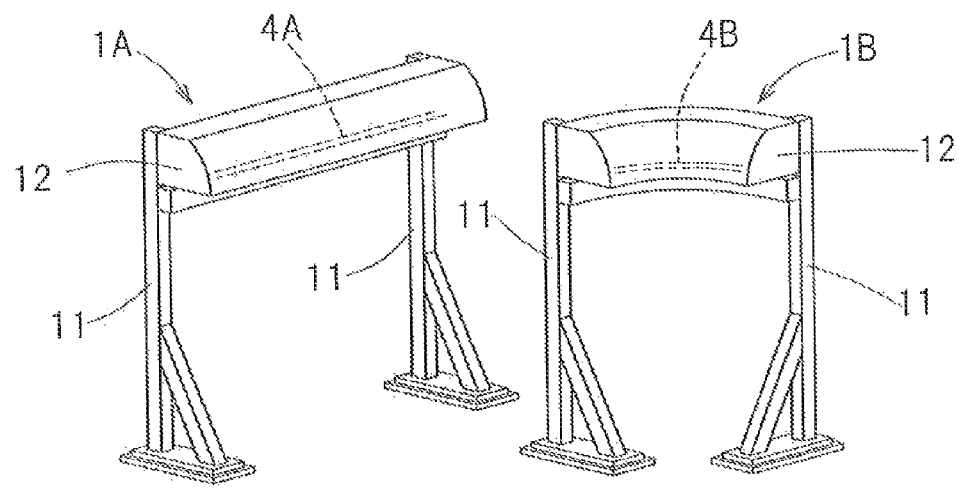
FIG. 2 is a perspective view showing guide units of a travel guide included in the conveyance system in accordance with a first preferred embodiment of the present invention.

As shown in FIG. 2, a transport apparatus main body excluding the traveling member 3 of the transport apparatus 1 preferably includes one or a plurality of rectilinear section travel guide units 1A, each including the rectilinear section 4A, and one or a plurality of curved section travel guide units 1B each including the curved section 4B. The travel guide units 1A and 1B are sequentially connected to render the transport apparatus main body to define a transport path of any desired shape.

Figure 3:
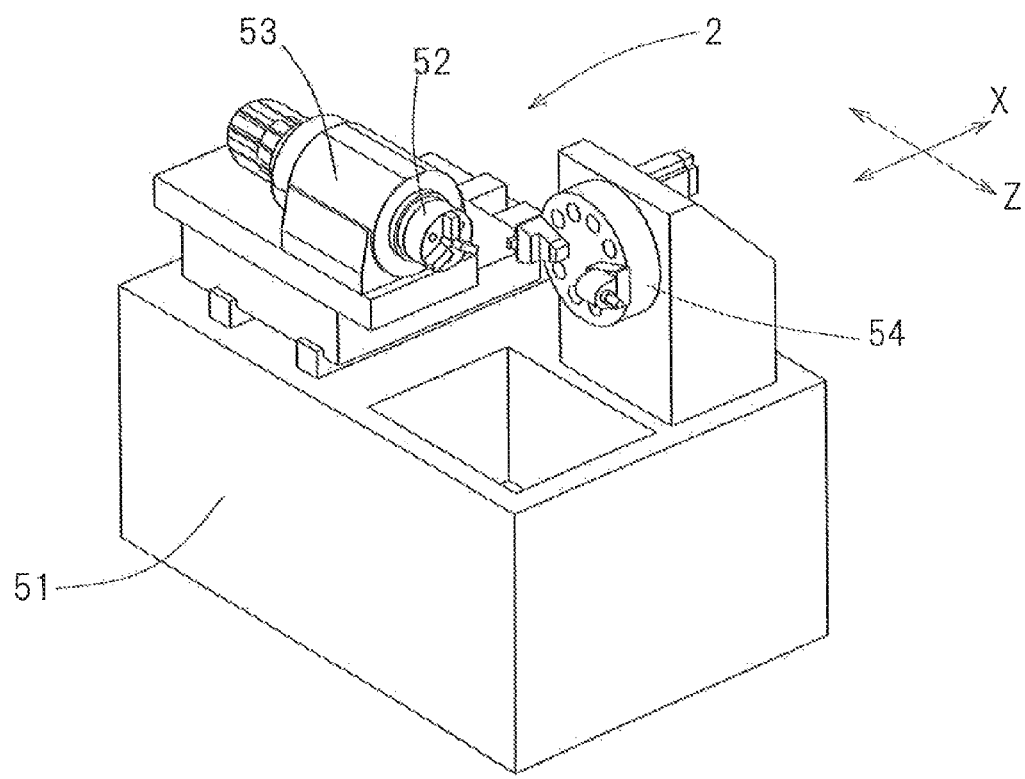
FIG. 3 is a perspective view showing one example of the machine tool included in the processing facility in accordance with a first preferred embodiment of the present invention.

As shown in FIG. 3, the machine tool 2 is preferably a lathe including a headstock 53 mounted on a bed 51 to support a work support unit 52 including a spindle, and a turret type tool holder or tool rest 54 also mounted on the bed 51 and defining a processing unit. The machine tool 2 shown preferably is a lathe of a headstock moving type, in which the headstock 53 is mounted for movement in an anteroposterior direction (a Z-axis direction) and a left-right direction (an X-axis direction). It is, however, to be noted that instead of the headstock moving type referred to above, a tool rest moving type may alternatively be employed, in which the headstock 53 is mounted fixedly on the bed 51 and the tool rest 54 is made movable in the anteroposterior direction and also in the left-right direction.

Figure 4:
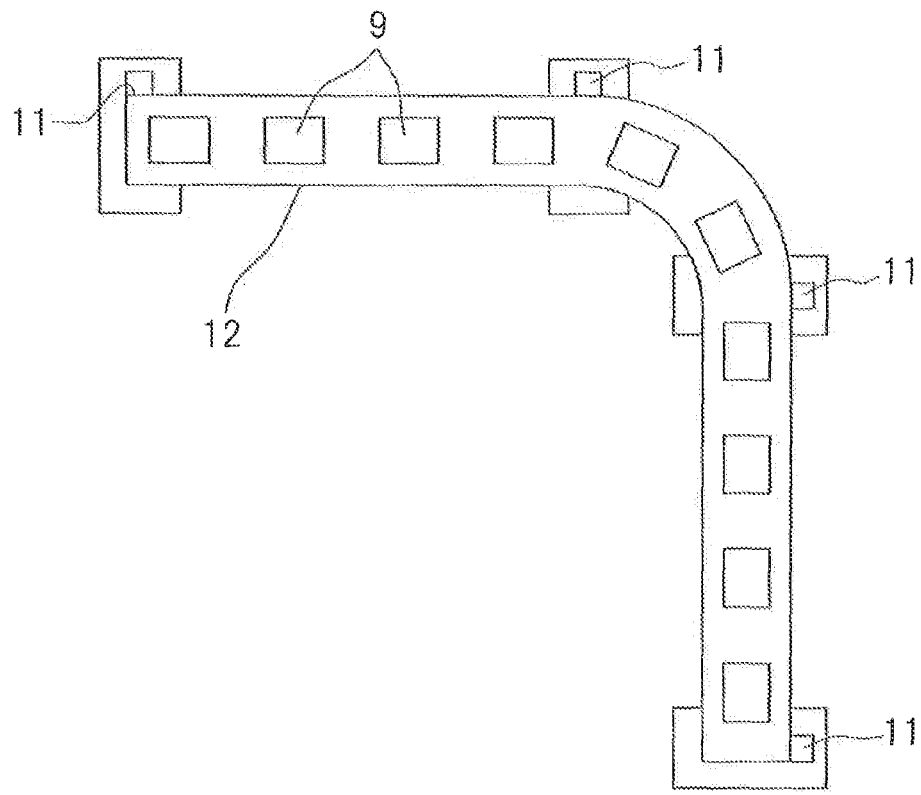
FIG. 4 is a top plan view of the conveyance system in accordance with a first preferred embodiment of the present invention.
Figure 5:
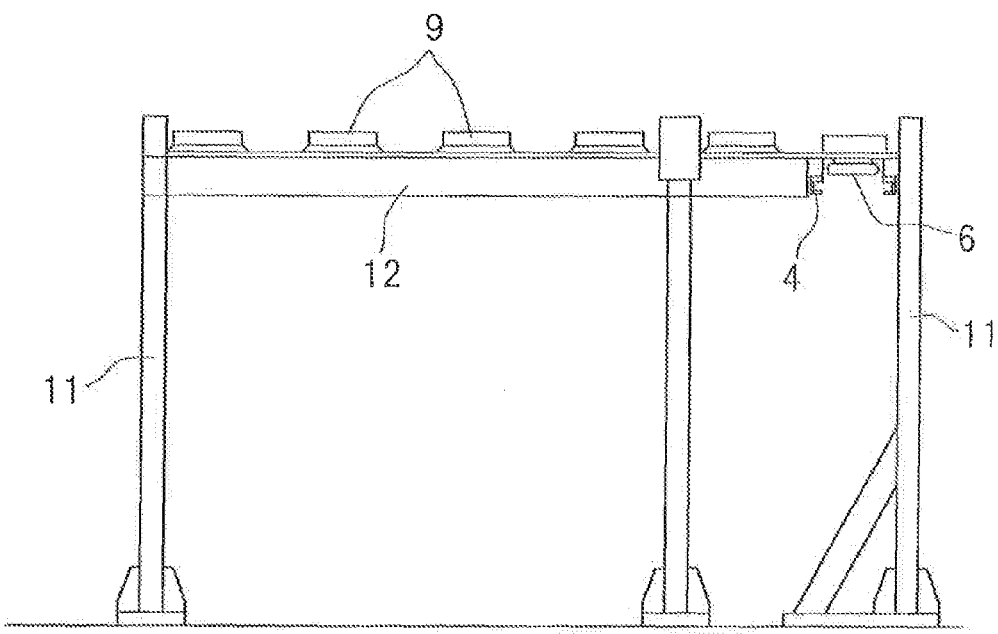
FIG. 5 is a front elevational view showing the conveyance system in accordance with a first preferred embodiment of the present invention.
Figure 8:
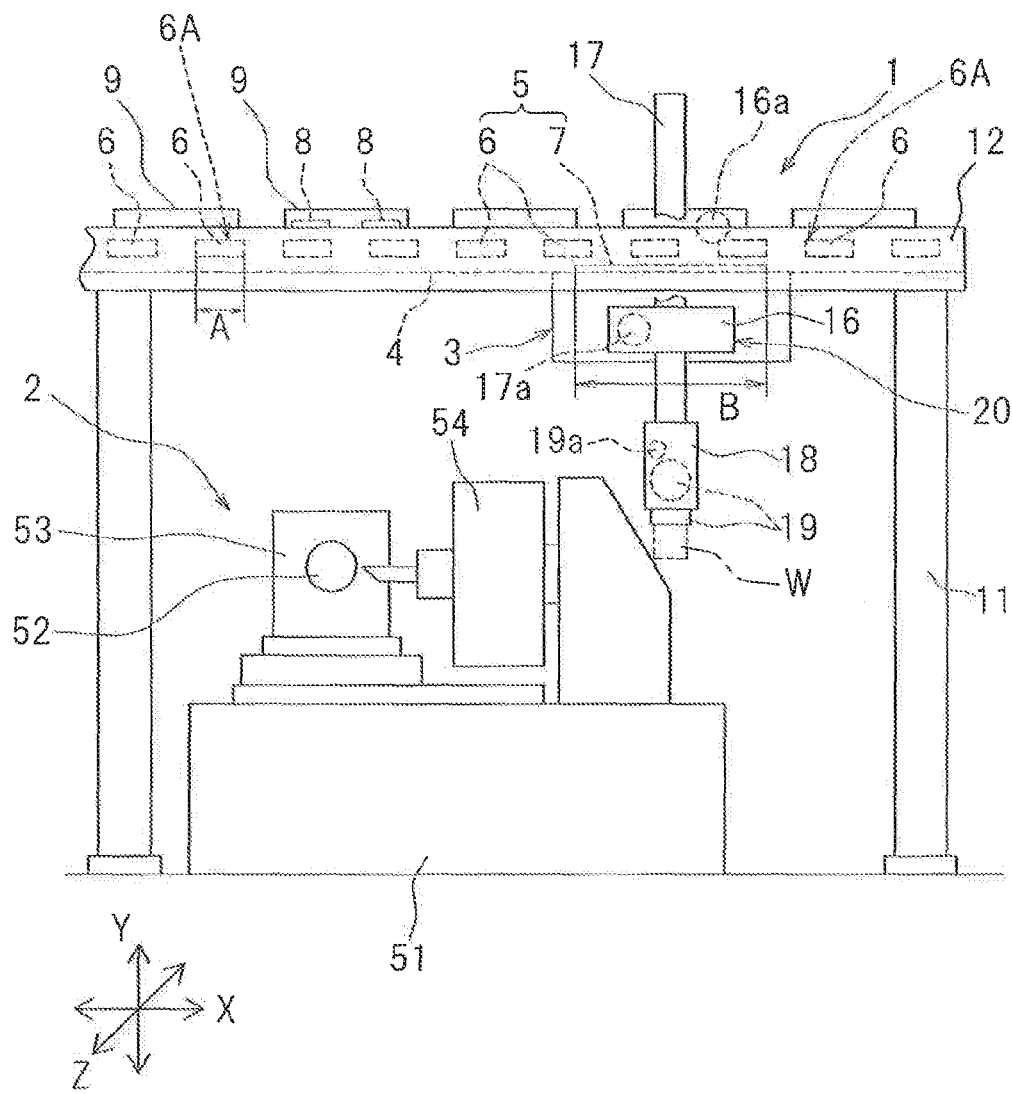
FIG. 8 is a fragmentary front elevational view of a portion of the processing facility in accordance with a first preferred embodiment of the present invention.

Referring now to FIG. 8, the transport apparatus 1 is preferably of a type in which the traveling member 3 to transport the work W is movably mounted on the travel guide 4, and is operable to deliver the work W to the work support unit 52 and to receive the work W from the work support unit 52. The travel guide 4 is preferably provided on a horizontal frame 12, supported by a plurality of support pillars 11, so as to extend in a lengthwise direction. The positional relation between the support pillars 11 and the frame 12 is shown in FIG. 4, showing a top plan view of the conveyance system, and FIG. 5 showing a front elevational view thereof.

The traveling member 3 best shown in FIG. 8 is preferably provided with a chuck 19, which is a holding unit arranged to hold the work W in the form of an article to be transported, and a chuck moving mechanism 20 to move the chuck 19. The chuck moving mechanism 20 preferably includes an anteroposterior movable carriage 16 mounted on the traveling member 3 for selective advance and retraction in the anteroposterior direction (Z-axis direction) that is perpendicular or substantially perpendicular to a direction of travel (X-axis direction), a rod-like lifter 17 installed on the anteroposterior movable carriage 16 for selective ascending and descending, and a work holding head 18 provided at a lower end of the lifter 17. The chuck 19 referred to previously is preferably provided two in number on the work holding head 18.

The two chucks 19 are adapted to be replaced by a chuck direction converting mechanism (not shown) within the work holding head 18 between a downwardly oriented position and a forwardly oriented position. The anteroposterior movable carriage 16 is preferably operated by an electrically operated drive source 16a such as, for example, a motor mounted on the traveling member 3, so as to move in an anteroposterior direction and, on the other hand, the lifter 17 is preferably driven by an electrically operated drive source 17a such as, for example, a motor mounted on the anteroposterior movable carriage 16 so as to ascend and descend. The chuck 19 preferably includes chuck pawls (not shown) that are selectively opened or closed by an electrically operated drive source 19a such as, for example, a solenoid to hold the work W to be transported. Switching over between the two chucks 19 and 19 referred to above is preferably accomplished by a switching drive source (not shown) such as, for example, a motor.

Figure 9:
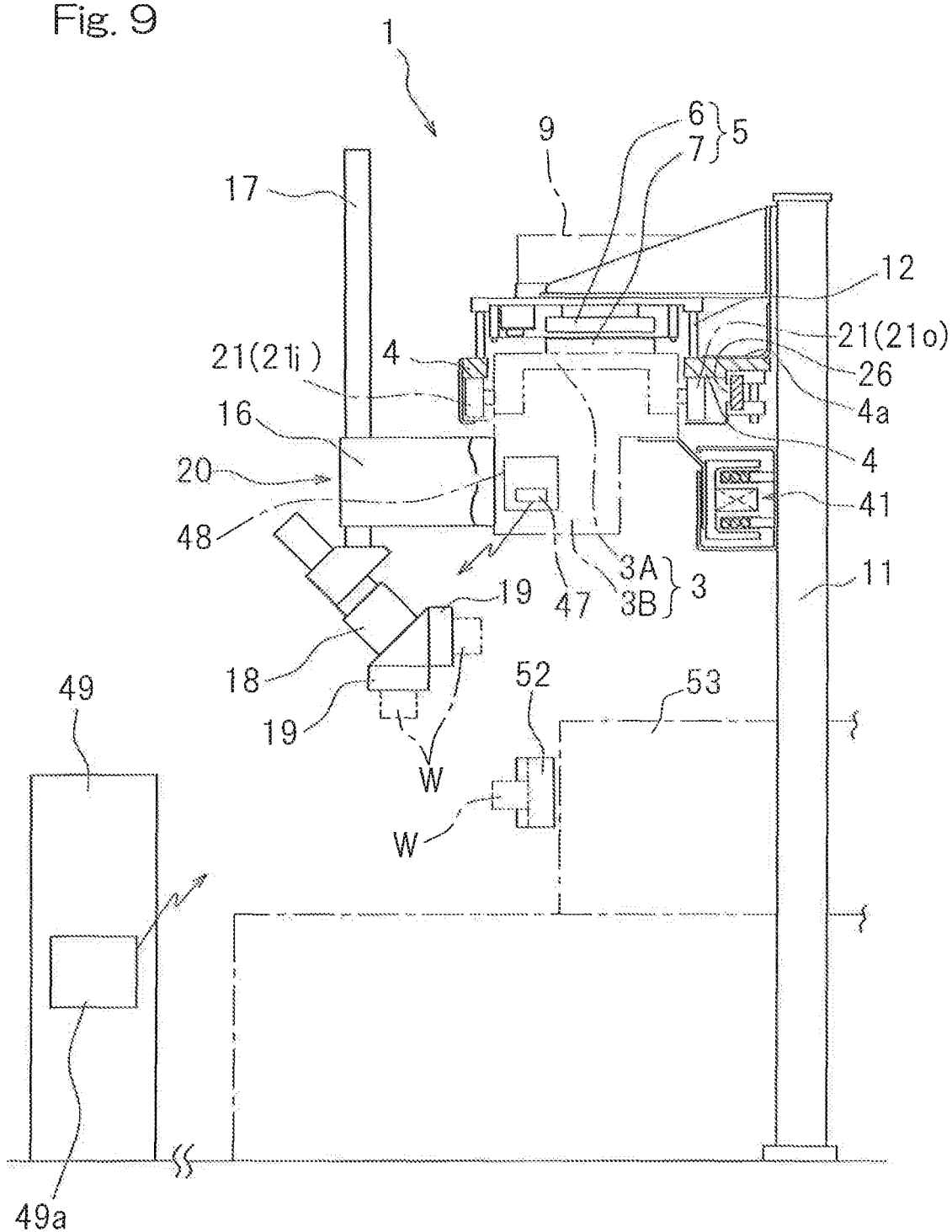
FIG. 9 is a side view, with a portion broken away, showing the conveyance system in the processing facility in accordance with a first preferred embodiment of the present invention.

As shown in FIG. 9, the traveling member 3 preferably includes a traveling member main body 3A including traveling wheels 21 (21i, 21o) and a transfer mechanism mounting platform 3B fitted to an undersurface of the traveling member main body 3A and supporting the moving mechanism 20 including the anteroposterior movable carriage 16 or the like.

Figure 6:
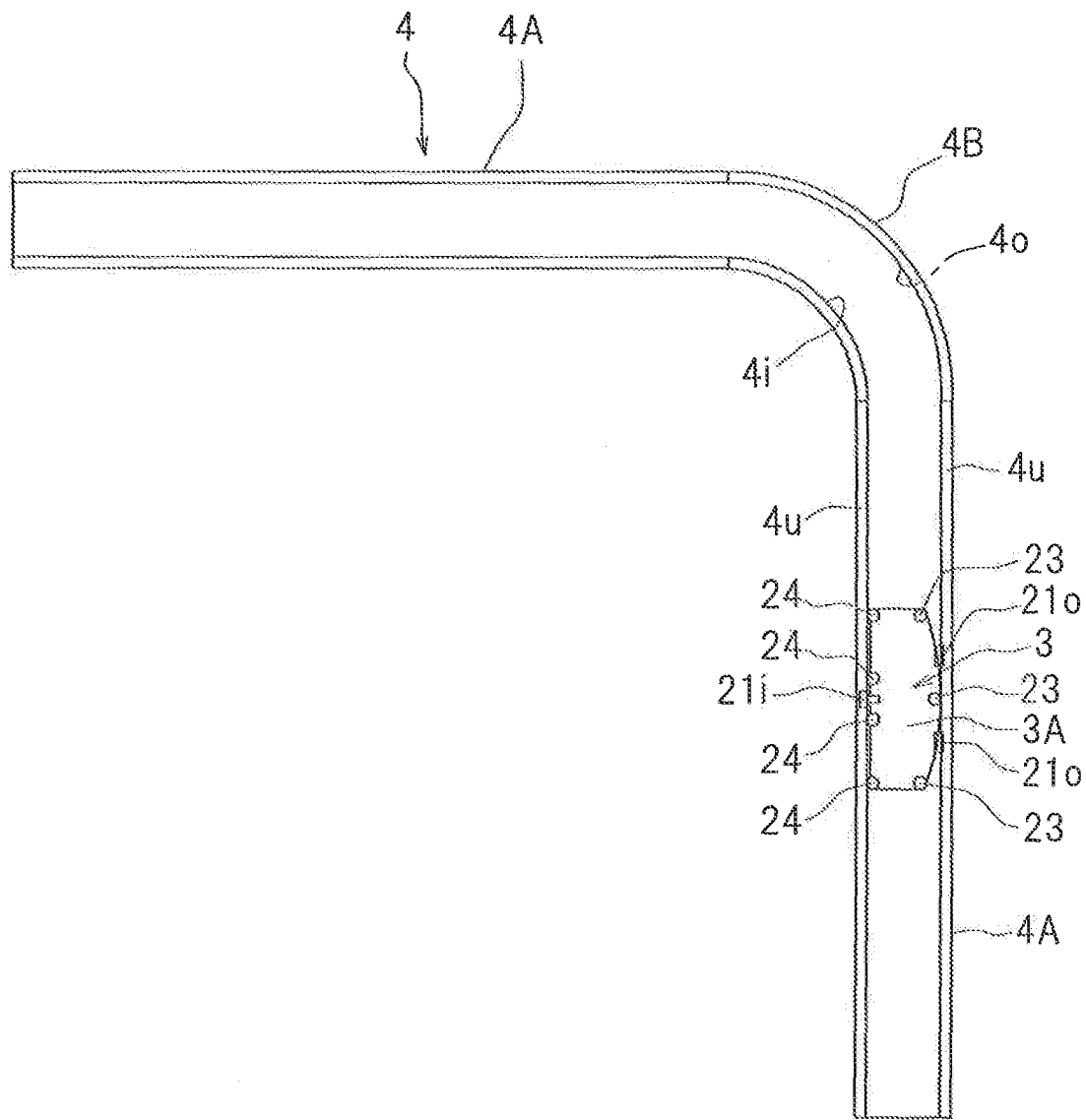
FIG. 6 is a top plan view showing the relation between the travel guide and a traveling member both included in the conveyance system in accordance with a first preferred embodiment of the present invention.

As shown in a top plan view in FIG. 6, the travel guide 4 preferably includes the two rectilinear sections 4A and 4A, which lie perpendicular or substantially perpendicular to each other, and the curved section 4B that connects the rectilinear sections 4A and 4A together. There are provided an outer diameter side guide surface 4o and an inner diameter side guide surface 4i, which are continued over those rectilinear sections 4A and the curved section 4B and which are positioned on outer and inner diameter sides of the curved section 4B in parallel or substantially parallel relation to each other so as to be oriented inwardly and outwardly, respectively. Further, there are provided a pair of wheel guide surfaces 4u, oriented in a direction upwards and downwards, in the curved section 4B. Each of the wheel guide surfaces 4u is provided along the outer diameter side guide surface 4o and the inner diameter side guide surface 4i.

Figure 11:
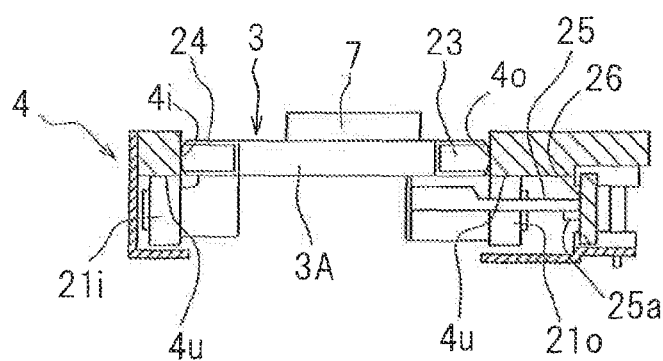
FIG. 11 is a transverse sectional view showing the travel guide and the traveling member main body both included in the conveyance system in accordance with a first preferred embodiment of the present invention.

As shown in a sectional representation in FIG. 11, the outer diameter side guide surface 4o and the inner diameter side guide surface 4i are preferably positioned above traveling wheels 21i and 21o that run on the wheel guide surface 4u. The traveling member main body 3A of the traveling member 3 is provided not only with the traveling wheels 21i and 21o, but also with outer diameter side rollers 23, which are guided by the outer diameter side guide surface 4o, and inner diameter side rollers 24, which are guided by the inner diameter side guide surface 4i. The outer and inner diameter side rollers 23 and 24 rotate about a vertical axis.

Figure 10A:
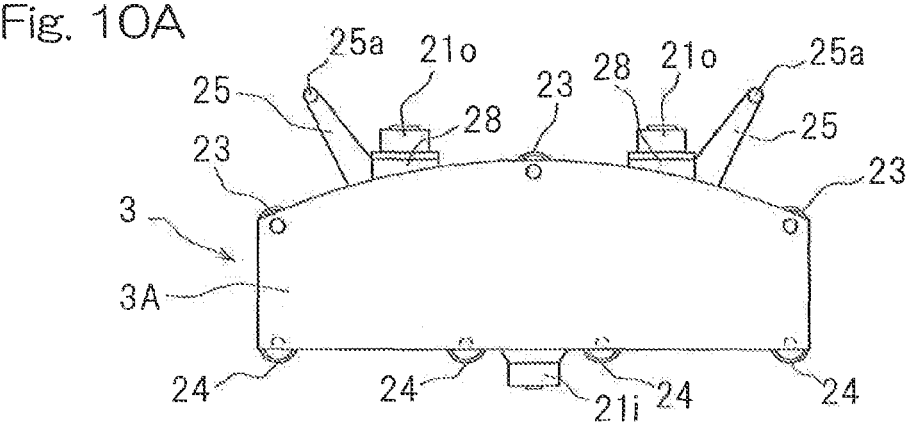
FIG. 10A is a top plan view of the traveling member main body included in the conveyance system in accordance with a first preferred embodiment of the present invention.
Figure 10B:
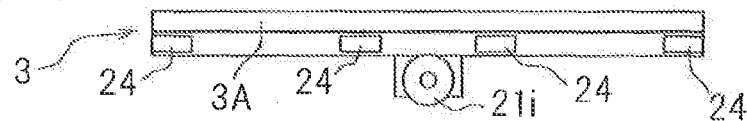
FIG. 10B is a front elevational view of the traveling member in accordance with a first preferred embodiment of the present invention.
Figure 10C:
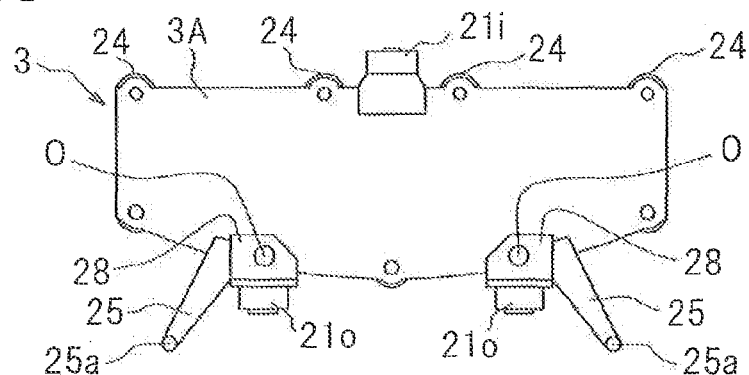
FIG. 10C is a bottom plan view of the traveling member in accordance with a first preferred embodiment of the present invention.
Figure 10D:
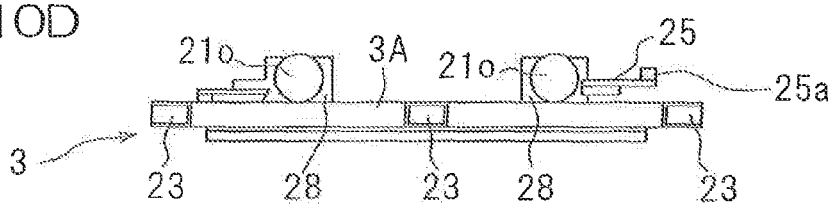
FIG. 10D is a rear plan view of the traveling member in accordance with a first preferred embodiment of the present invention.

Referring to FIGS. 10A to 10D, the number of the outer diameter side rollers 23 and that of the inner diameter side rollers 24 are preferably chosen to be three or more, and those three or more outer and inner diameter side rollers 23 and 24 are arranged in respective rows extending in a direction parallel or substantially parallel to the direction of travel. In the instance as shown, the outer diameter rollers 23 are positioned adjacent front and rear ends and an intermediate portion of the traveling member main body 3A, thus totaling to three in number. Those three or more outer diameter side rollers 23 preferably are arranged to define an arcuate shape corresponding to the arcuate shape of the outer diameter side guide surface 4o which defines the curved section 4B (FIG. 6). On the other hand, the inner diameter side roller 24 preferably are arranged to define a rectilinear shape corresponding to a portion of the inner diameter side guide surface 4i which defines the rectilinear section 4A, thus totaling four in number. In detail, the inner diameter side rollers 24 are positioned at two locations adjacent to front and rear ends of the traveling member main body 3A and two locations on anteroposterior sides of an intermediate portion of the traveling member main body 3A. As shown in FIG. 10A, the traveling member main body 3A preferably has a plan shape in which a side edge on the outer diametric side represents an arcuate shape following a portion of the outer diametric side guide face 4o defining the curved section 4B, but it may be of any suitable shape provided that it will not interfere with the travel guide 4, and is therefore of any freely designed shape.

The traveling wheels 21i and 21o in the traveling member main body 3A are provided on widthwise opposite sides so that these wheels 21i and 21o can run on the two guide surfaces 4u on the opposite sides. The traveling wheel 21o on the outer diameter side is rotatably mounted on a movable wheel support body 28 which is so supported as to be turned in direction about the vertical axis O relative to the traveling member main body 3A. Each of those movable wheel support bodies 28 is preferably provided with a direction manipulating element 25 of a lever shape protruding towards the outer diameter side, and a front end of the direction manipulating element 25 is preferably provided with a cam follower 25a such as, for example, a roller that is rotatable about the vertical axis. A cam surface 26 (best shown in FIG. 11) to guide the cam follower 25a at the free end of the respective direction manipulating element 25 is provided in the travel guide 4 over the entire length in a direction conforming to the direction of travel. The cam surface 26 is so provided at a location, where the traveling member 3 enters the curved section (best shown in FIG. 6), that the direction of the associated traveling wheel 21o can be forcibly diverted.

Referring now to FIG. 8, a running drive of the traveling member 3 is preferably carried out by a linear motor 5 of a synchronous type. The linear motor 5 preferably is a discrete or discontinuous type linear motor including a plurality of individual motors 6, mounted on the frame 12, and a single mover or movable magnet array 7. Each of the individual motors 6 is of a type capable of functioning as an armature on the primary side of a separate, single linear motor. Those individual motors 6 are arranged along the travel guide 4 over the entire traveling zone of the traveling member 3 and having spaced a distance from each other. The mover 7 referred to above is preferably defined by a permanent magnet and is mounted on the traveling member 3. A motor drive device arranged to drive the linear motor 5 preferably includes a plurality of individual motor drive devices 8 to drive the respective individual motors 6 and a multiple unit controller 10 (which will be described in detail with particular reference to FIG. 17) to apply position commands and others to the individual motor drive devices 8. Two of the individual motor drive devices 8 are provided in a motor drive circuit block 9 and the respective motor drive circuit block 9 is mounted on the frame 12.

Figure 13:
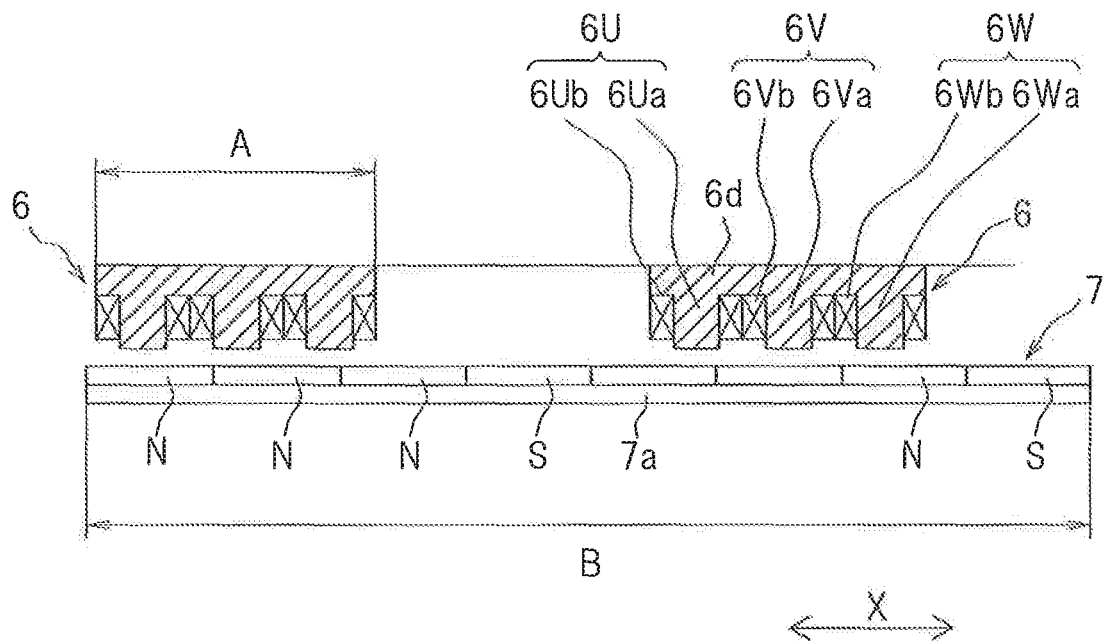
FIG. 13 is a fragmentary sectional view showing the linear motor in accordance with a first preferred embodiment of the present invention.
Figure 14:
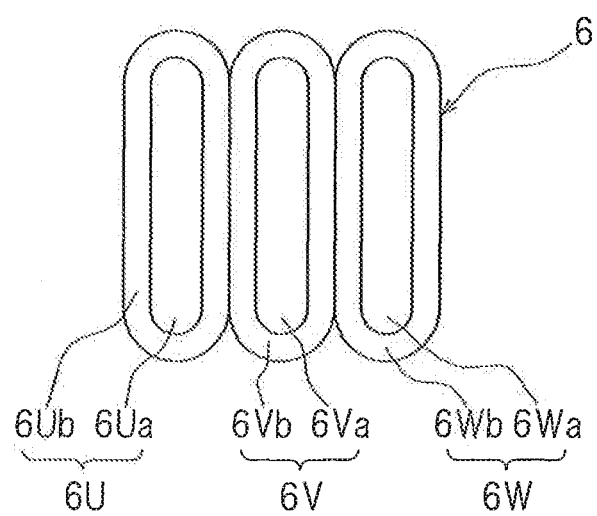
FIG. 14 is a top plan view showing individual motors of the linear motor in accordance with a first preferred embodiment of the present invention.

As shown in FIGS. 13 and 14, each of the individual motors 6 is preferably of a type that can be driven with a three-phase alternating current and is a three pole armature provided with three electrodes 6U, 6V and 6W one for each of the three phases (U, V and W phases). The direction of arrangement of those electrodes 6U, 6V and 6W corresponds to a moving direction X of the mover 7. Each of those electrodes 6U, 6V and 6W preferably includes a core 6Ua, 6Va and 6Wa and a coil 6Ub, 6Vb and 6Wb. The cores 6Ua, 6Va and 6Wa are of a type protruding pectinately from a common core base portion 6d. The individual motors 6 arranged in a plural number are preferably identical in structure with each other and, accordingly, respective lengths A thereof as measured in a direction conforming to a mover running direction are identical with each other. It is to be noted that although in this example, the number of the pole of each of the individual motors 6 has been shown and described as three, it may not be necessarily limited to three, but it may be an integral multiplicity of three, for example, nine. The movers 7 each in the form of N and S magnetic poles defined by a permanent magnet are preferably provided in a plural number and are arranged on a mover base body 7a in a direction conforming to the traveling direction X. It is also to be noted that the number of the N and S magnetic pole pairs may be arbitrarily designed. The mover 7 has a length B that is sufficient to extend over the plurality of the individual motors 6.

Figure 17:
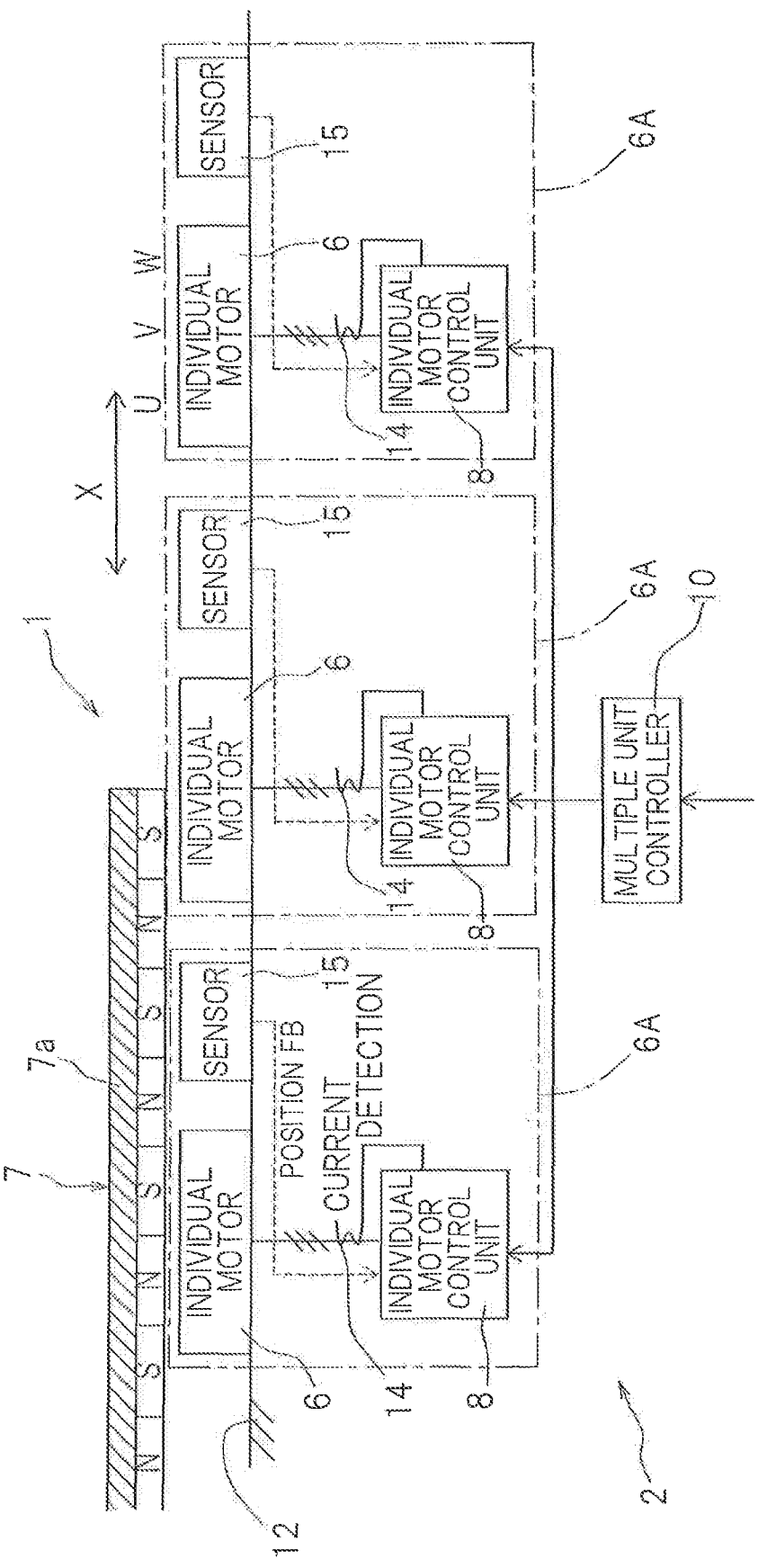
FIG. 17 is a block circuit diagram showing a drive system of the linear motor in accordance with a first preferred embodiment of the present invention.
Figure 18:
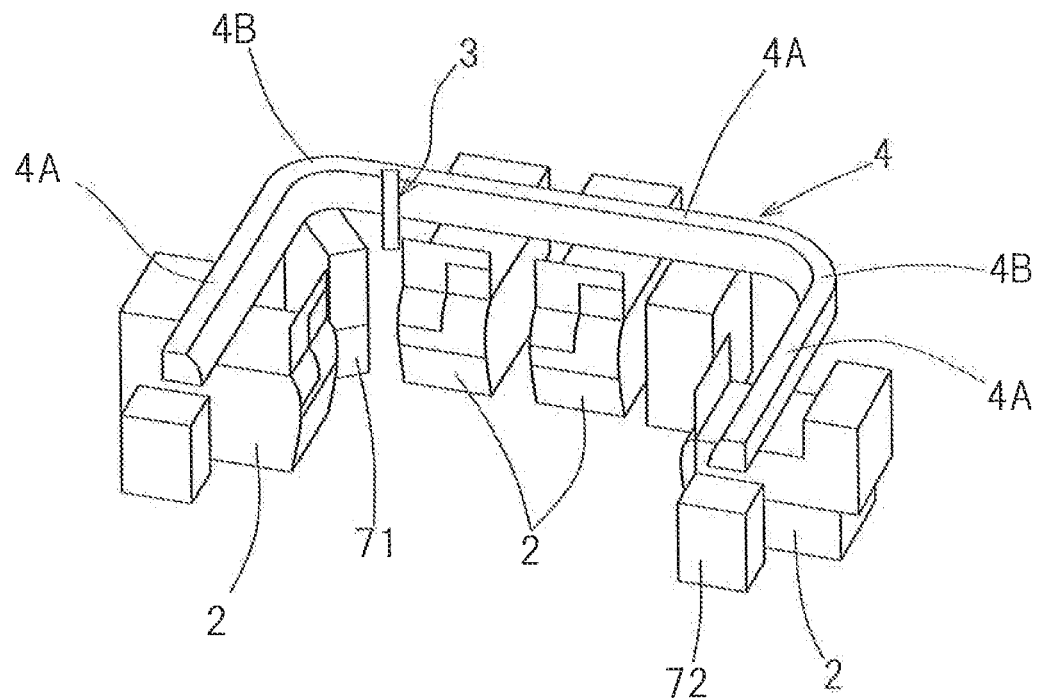
FIG. 18 is a perspective view of the conveyance system in accordance with a second preferred embodiment of the present invention.

Referring to FIG. 17, the multiple unit controller 10 referred to previously are operable in response to a position command, fed from a host control unit, to apply position commands necessary to drive the corresponding individual motors 6 to respective individual motor control units 8. In other words, the position command, which is converted into a coordinate system of each of the individual motors 6, is applied to the individual motor control units 8 for the respective individual motors 6. That is to say, each of the individual motor control units 8 is a "traveling control unit" operable to accomplish a traveling control of the traveling member 3. The multiple unit controller 10 is preferably provided by a computer such as, for example, a microcomputer or a personal computer, a program there for, circuit elements, and so on.

Each of the individual motor control units 8 is preferably defined by a motor drive circuit (not shown) of a strong current system arranged to supply an electric motor current to the associated individual motor 6 and a control unit (not shown) of a weak current system arranged to control the motor drive circuit, and includes a substrate including various circuit elements mounted thereon. The motor drive circuit of the strong current system preferably includes an inverter or the like provided with a plurality of switching elements and is connected with a direct current source (not shown) for driving purposes. The control unit of the weak current system for each of the individual motor control units 8 and the multiple unit controller 10 are preferably provided by a microcomputer and a program there for and various circuit elements and so on.

Each of the individual motor control units 8 preferably has a function of controlling a feedback control of the position, velocity and electric current in a cascade control. The position feedback performs a feedback control of a predetermined position loop gain in dependence on a deviation between a detection value of a sensor 15 to detect the current position of the mover 7 relative to the individual motor 6 and a command value of the position command The velocity feedback is carried out with the use of a speed detection value obtained through a derivation from the position detection value of the sensor 15. The current feedback controls an electric motor drive current by detecting a drive current, applied to the individual motor 6, with an electric current detecting unit 14, and then generating the electric current value dependent on the deviation between the electric current detection value and the electric current command value with the use of a predetermined electric current loop gain. This electric current control unit 13 is preferably of a type capable of performing a control by way of a vector control or the like and has a function of performing an electric current control in correspondence with the magnetic pole position of the mover 7.

Figure 15:
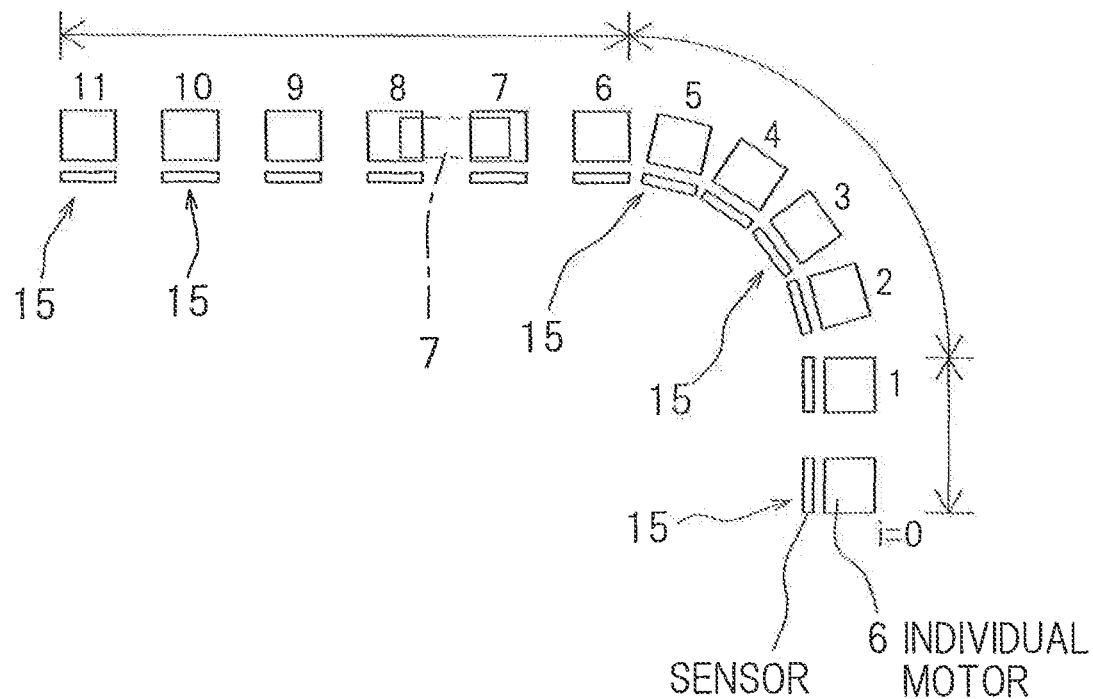
FIG. 15 is a top plan view showing an arrangement of the individual motors of the linear motor in accordance with a first preferred embodiment of the present invention.
Figure 16:
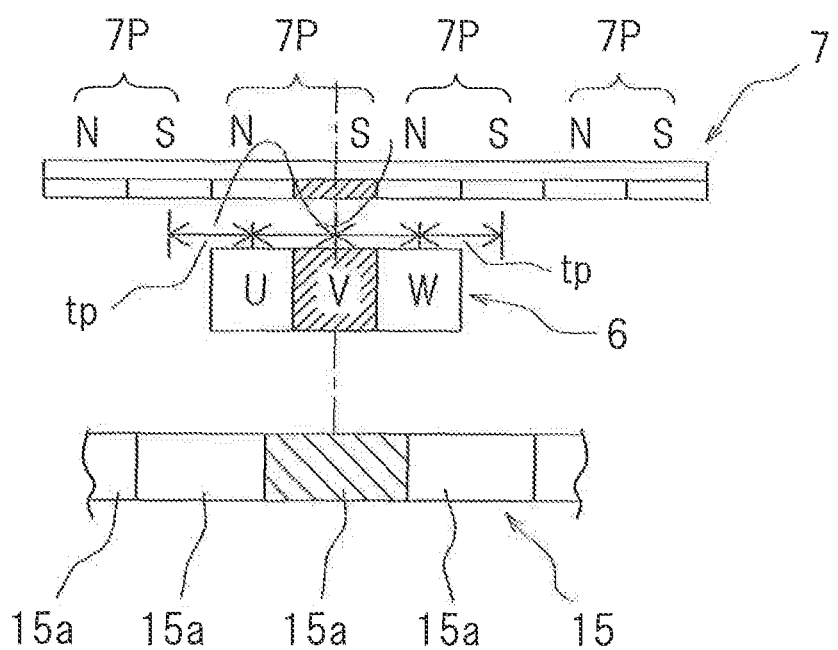
FIG. 16 is a sectional view showing the relation between the linear motor and a sensor in accordance with a first preferred embodiment of the present invention.

As shown in FIG. 15, each of the sensors 15 is preferably a linear scale, which is arranged in a rectilinear direction conforming to the direction of arrangement of the coils of the individual motors 6 and is of a type capable of accomplishing a position detection within a somewhat longer range than the length of the individual motors 6. Each of the sensors 15, as specifically shown in FIG. 16, preferably includes a plurality of sensor elements 15a arranged in a direction lengthwise thereof, and each of the sensor elements 15a preferably includes a magnetic sensor element arranged to detect the magnetism of the mover 7. More specifically, each of the sensor elements 15a is operable to detect the magnetic pole position of the magnetic pole pair 7P of each of the mover 7. In other words, for the length tp of the magnetic pole pair 7P, a magnetic force having a peak of one N-pole side and S-pole side is generated, and therefore, the detection of the peak position on the N-pole side or S-pole side results in detection of the magnetic pole position. Also, the sensor 15 outputs one position detection value, which corresponds to the position of the mover 7, from an output of each of the sensor elements 15a. It is to be noted that the sensor 15 is preferably provided as a position sensor arranged to detect merely the position of the mover 7 and a magnetic pole sensor may be provided separate from the sensor 15, or a particular one of the sensor elements 15a of the sensor 15 may be used as a magnetic pole sensor arranged to detect an electric current by way of magnetic poles.

Figure 7:
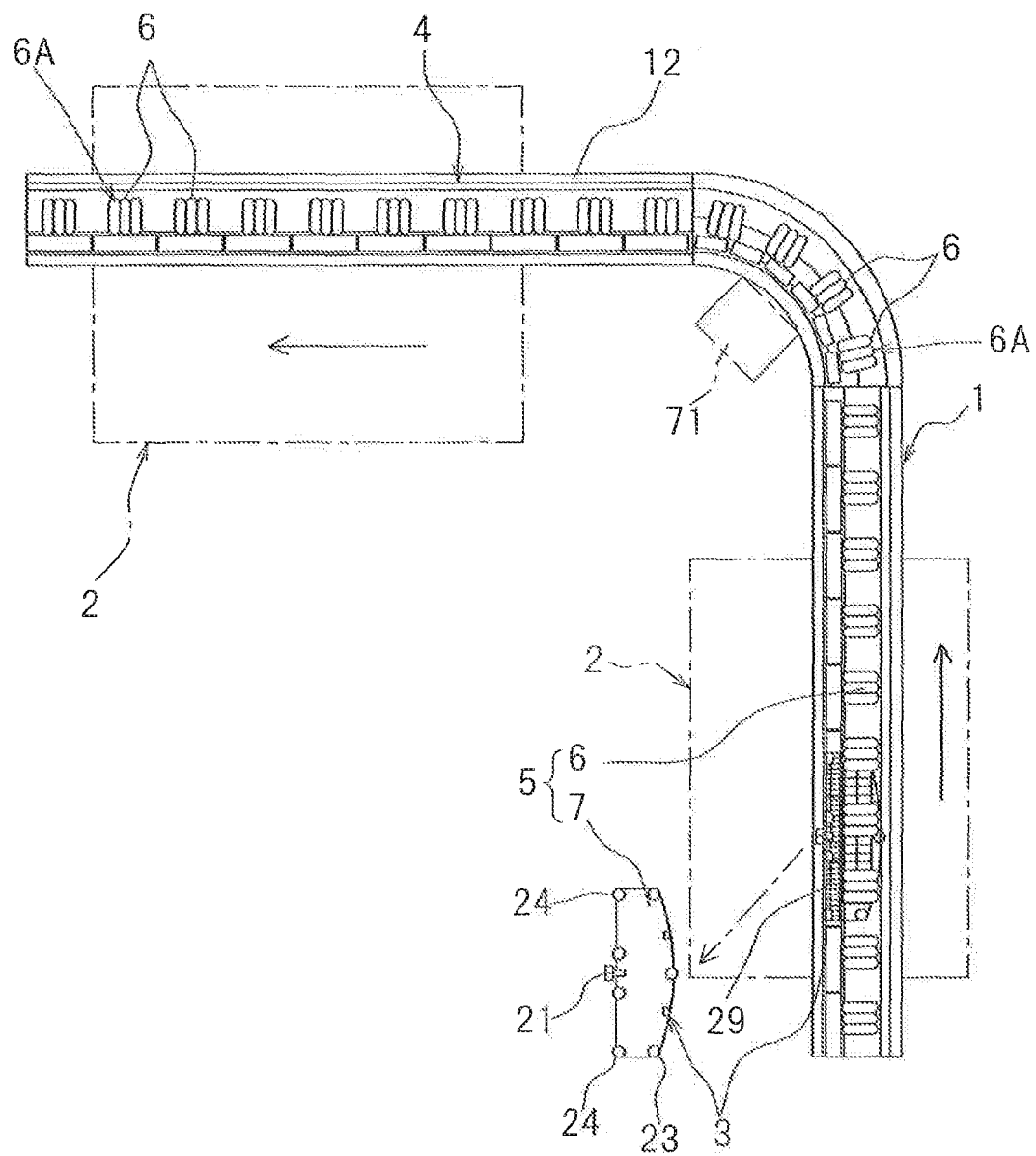
FIG. 7 is a top plan view showing the relation between the travel guide, a linear motor and the traveling member, all included in the conveyance system in accordance with a first preferred embodiment of the present invention.
Figure 12:
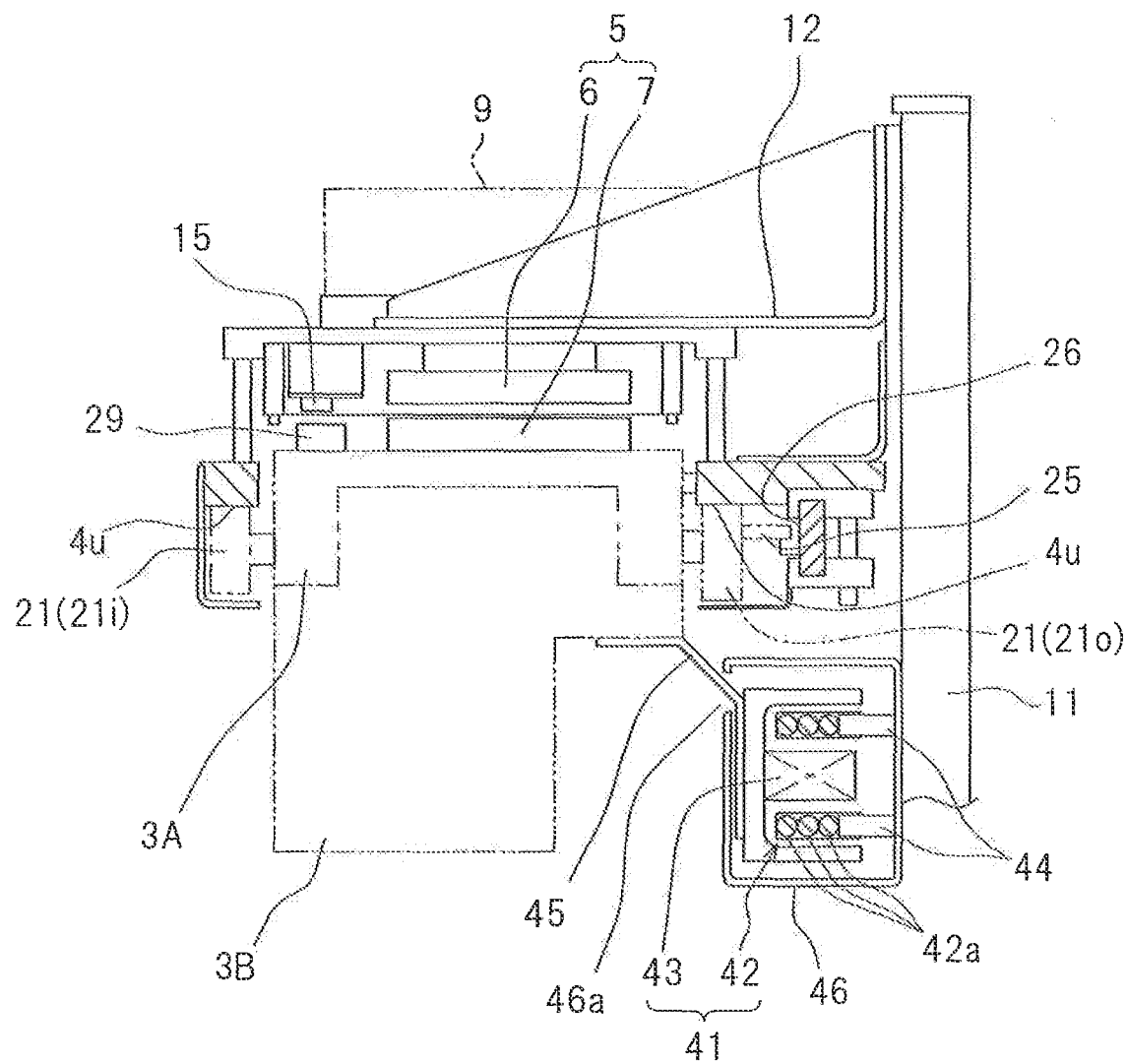
FIG. 12 is a sectional view, on an enlarged scale, showing a portion of the conveyance system shown in FIG. 9 in accordance with a first preferred embodiment of the present invention.

It is to be noted that although in the foregoing description the magnetic pole position of the mover 7 has been shown and described as detected directly, positioning of the sensors 15 is difficult to achieve in order to directly detect the magnetic pole position. In view of this, in the preferred embodiment now under discussion, as best shown in FIGS. 7 and 12, a plurality of position detecting magnets 29 are provided in the traveling member 3 so as to assume a position laterally of the mover 7 so that the magnetic pole position of the magnets 29 in the traveling direction may align with magnetic pole position of the mover 7. The sensor 15 detects the magnetic pole position of the mover 7 by detecting the position detecting magnets 29.

Referring to FIG. 17, the individual motor 6, the individual motor control unit 8 and the sensor 15 cooperate with each other to define one set of the individual motor set 6A. This individual motor set 6A is installed on the frame 12 along the travel guide 4 as shown in FIG. 8. As shown in FIG. 7, even at the curved section 4B of the travel guide 4, the individual motor set 6A is installed in a manner similar to that in the rectilinear section 4A. In the individual motor set 6A in the curved section 4B, the individual motor control unit 8 (best shown in FIG. 17) preferably has a function of correcting the detection value of the sensor 15 in dependence on the curved line.

As shown in FIG. 9, the traveling member 3 preferably includes the chuck 19, which defines a holding unit for the work W, and the chuck moving mechanism 20 to move the chuck 19 in an anteroposterior direction and in a vertical direction, which are directions different from the traveling direction of the traveling member 3. The drive sources 16a and 17a (best shown in FIG. 8) of the moving mechanism 20 and the drive source 19b for the chuck 19 are preferably of an electrically operated type, and supply of an electric power to these drive sources 16a, 17a, and 19a is carried out by a non-contact power feeding device 41.

As best shown in FIG. 12, the non-contact power feeding device 41 referred to above preferably includes an electric power supplying unit 42, defined by wirings 42a on the primary side of each of the poles provided along the travel guide 4, and an electric power receiving unit 43, defined by a coil on the secondary side, provided in the traveling member 3 for movement while held in a fashion proximate to and along the wirings 42a. The wirings 42a are preferably supported by a wiring support member 44. The wiring support member 44 is installed on the frame 12 provided in the travel guide 4 or on the pillar 11 used to support the frame 12. The electric power receiving unit 43 defined by a coil in each phase is supported by the traveling member 3 through a movable side support member 45. The coil in each phase, which defines the electric power receiving unit 43, is connected with the drive sources 16a, 17a, and 19a of the moving mechanism 20 referred to previously. The wirings 42a of the electric power supplying unit 42 are preferably covered by a covering 46 including a slit 46a defined therein for the passage of the movable side support member 45 therethrough. It is to be noted that since an electric current received by the electric power receiving unit 43 is preferably an alternating current resulting from an induced current, the individual motor control unit 8 is provided with a rectifying circuit (not shown) that rectifies the alternating current and the rectifying circuit serves as a direct current power source for the inverter referred to previously.

Also, as shown in FIG. 9, the traveling member 3 preferably includes a wireless communicating unit 47 mounted thereon, and a command transmitting unit 48 is mounted on the traveling member 3, which command transmitting unit 48 controls the respective electrically operated drive sources 16a, 17a, and 19a of the moving mechanism 20 and the chuck 19 in response to a signal communicated by the wireless communicating unit 47. The command transmitting unit 48 may preferably be a wiring arranged to transmit a signal between the wireless communicating unit 47 and the drive sources 16a, 17a, and 19a. Also, the command transmitting unit 48 preferably includes a wiring, provided in the traveling member 3, arranged to send signals of various sensors (not shown) in addition to a command to drive to the wireless communicating unit 47. The wireless communicating unit 47 on the traveling member 3 communicates with a wireless communicating unit 49a provided in a control device 49 to control the entire conveyance system. The various drive sources mounted on the traveling member 3 preferably are all electrically operated ones and, hence, wirings and piping necessary to connect with the ground side are all eliminated.

According to the conveyance system of the above described configuration, since the linear motor 5 defined by the individual motors 6, disposed along the travel guide 4, and the movers 7 on the secondary side installed in the traveling member 3 is utilized to drive the traveling member 3, the traveling member 3 can be precisely positioned even in the curved section 4B of the travel guide 4. For this reason, while the transfer table 71 to deliver and receive the work W relative to the travel body 3 is positioned at the curved section 4B, not only can the work W be assuredly delivered and received through the precise halting and positioning, but also the attitude of the work W, the holding position and others can be set properly. With the curved section 4B of the travel path used for delivery and receipt of the work W in this way, limitations imposed on the arrangement of the various machines and equipments within the factory can be relieved and the limited floor space in the factory can be utilized efficiently.

Since at the curved section 4B even the slight difference in the halting position of the traveling member 3 may adversely affect the direction of the work W, it is necessary to specifically and precisely design in the case of the machine tool 2 of a kind requiring a highly precise processing. As described above, positioning of the machine tool 2 in the rectilinear section 4A, at which a highly precise halting positioning can be accomplished, and also positioning of the transfer table 71 at the curved section are effective to allow the curved section 4B to be efficiently utilized to dispose machines and equipments while the required precise positioning accuracy is satisfied at various parts.

In addition, while the traveling member 3 includes the chuck 19 and the moving mechanism 20 arranged to move the chuck 19, the supply of the electric power is made through the non-contact power feeding device 41. Accordingly, the use of any cable wiring for the supply of the electric driving power is not needed in view of the structure used to drive the traveling member 3 by way of the linear motor 5 including the mover 7 on the secondary side provided in the traveling member 3. Because of this, the use of any cable required to provide the electric power supply between the traveling member 3 and the ground is eliminated, allowing the transport path to be freely designed. Also, in the practice of this preferred embodiment, the wireless communicating unit 47 is mounted on the traveling member 3 and by way of the signal communicated by the wireless communicating unit 47 the chuck 19 and the moving mechanism 20 are controlled. Thus, in addition to the non-contact power feeding, the wireless communicating unit 47 is used to transmit and receive the controlling signal, and therefore, it is possible to dispense with any wiring between the traveling member 3 and the ground as well as a transmission system for the control command. Accordingly, it is possible to design the transport path freely as desired.

In addition, the linear motor 5 is used in driving the traveling member 3; this linear motor 5 is preferably of the type in which the mover 7 on the secondary side is in the form of the permanent magnet of a kind having the N and S magnetic poles alternately arranged in a direction conforming to the direction of travel; and use is made of the sensor 15 to detect the magnetic poles of the mover 7 or to detect the magnetic poles of the detection magnets 29 that are provided in the traveling member 3 in a pattern identical with that of the magnetic poles of the mover 7. The positioning control of the traveling member 3 is performed in response to the output of the sensor 15 to detect the magnetic poles. Because of this, a further precise positioning control can be accomplished, and also a highly precise positioning can be accomplished even at the curved section. Accordingly, the delivery and receipt of the work W relative to the transfer table 71 at the curved section 4B can be performed further assuredly at a further proper angle.

FIG. 18 to FIGS. 23A to 23C respectively illustrate second to ninth preferred embodiments of the present invention. In the practice of the second preferred embodiment shown in FIG. 18, the travel guide 4 is preferably of a U-shaped configuration including three rectilinear sections 4A and two curved sections 4B each connecting the neighboring rectilinear sections 4A together, for example. The machine tools 2 are preferably disposed at respective positions of the rectilinear sections 4A, and the transfer table 71 is disposed at a position of one curved section 4B. At the intermediate rectilinear section 4A, two machine tools 2 are disposed in a row conforming to the direction of travel. Other structural features are similar to those shown and described in connection with the first preferred embodiment with particular reference to FIGS. 1 to 17.

Figure 19:
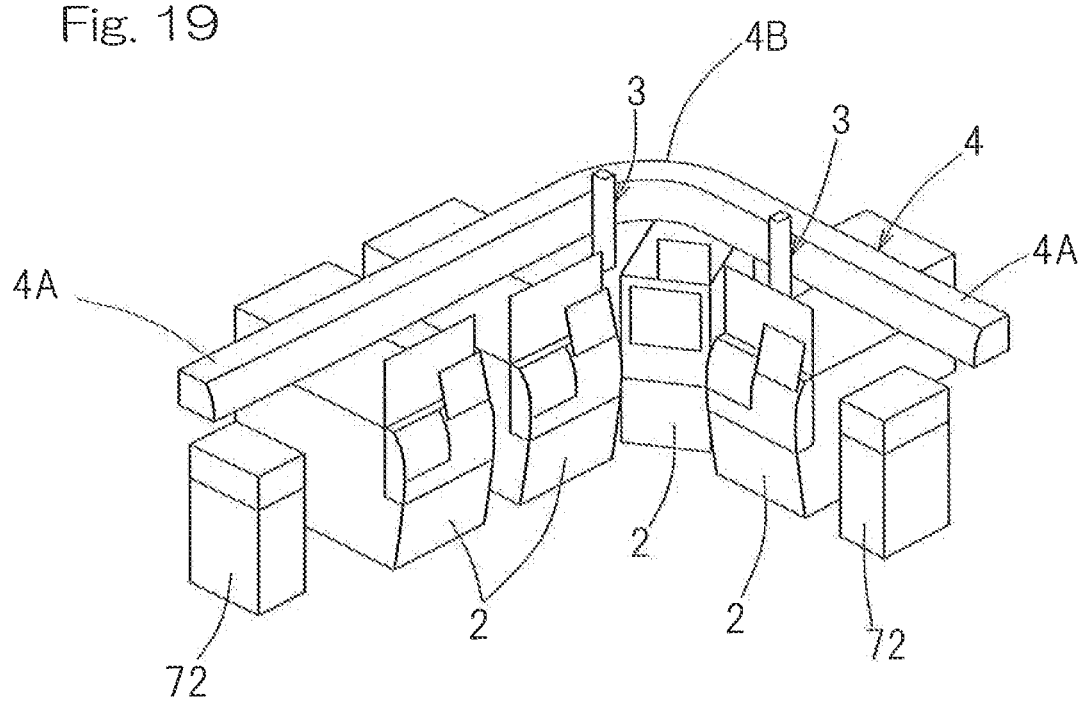
FIG. 19 is a perspective view of the conveyance system in accordance with a third preferred embodiment of the present invention.

In the practice of the third preferred embodiment shown in FIG. 19, while the travel guide 4 is preferably defined by the two rectilinear section 4A and the single curved section 4B in a manner similar to that in the previously described first preferred embodiment, but the machine tool 2 to deliver and receive the work relative to the transport apparatus 1 is preferably disposed at a position of the curved section 4B. Also, two machine tools 2 are preferably disposed in a row at one of the two rectilinear sections 4A. The traveling member 3 is provided two in number on a common travel guide 4. As hereinbefore described with particular reference to FIG. 8 and others, the drive source arranged to drive the traveling member 3 is the linear motor 5, which includes the plurality of the individual motors 6, each defined by an armature capable of functioning as an armature on the primary side of one independent linear motor, and the mover 7 on the secondary side mounted on the traveling member 3. Therefore, unlike a rotating type motor mounted on each of the traveling members, the individual motors 6 on the primary side can be commonly used to drive the mover 7. Hence, by providing the traveling member 3 with the mover 7 in the form of a permanent magnet, the number of the traveling members 3 can be advantageously increased with a simplified structure. Other structural features and effects are similar to those afforded by the previously described first preferred embodiment.

Figure 20:
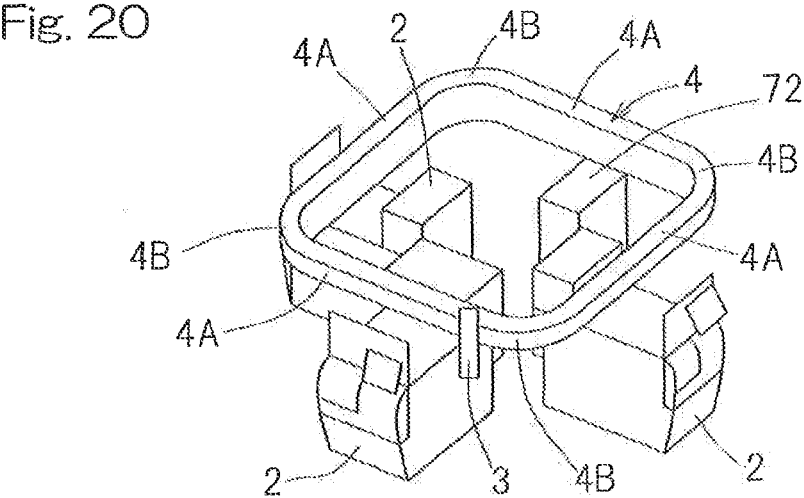
FIG. 20 is a perspective view of the conveyance system in accordance with a fourth preferred embodiment of the present invention.

In the practice of the fourth preferred embodiment shown in FIG. 20, the travel guide 4 preferably has a squared ring shape. In other words, four rectilinear sections 4A of the same length and four curved sections 4B each connecting the neighboring rectilinear sections 4A preferably define the ring shaped travel guide 4. The machine tools 2 are disposed at respective positions of the three rectilinear sections 4A and the transfer table 72 is disposed at the remaining one rectilinear section 4A. Other transfer tables (not shown) are preferably disposed at any of the curved sections 4B. With the linear motor 5, the non-contact power feeding device 41, and the control by the wireless communicating unit 47 combined together, the use of any wiring required to connect between the traveling member 3 and the ground side is dispensed with. For this reason, with no problem occurring in connection with wirings, the travel guide 4 of the ring shape can be realized. Other structural features and effects are similar to those afforded by the previously described first preferred embodiment.

Figure 21:
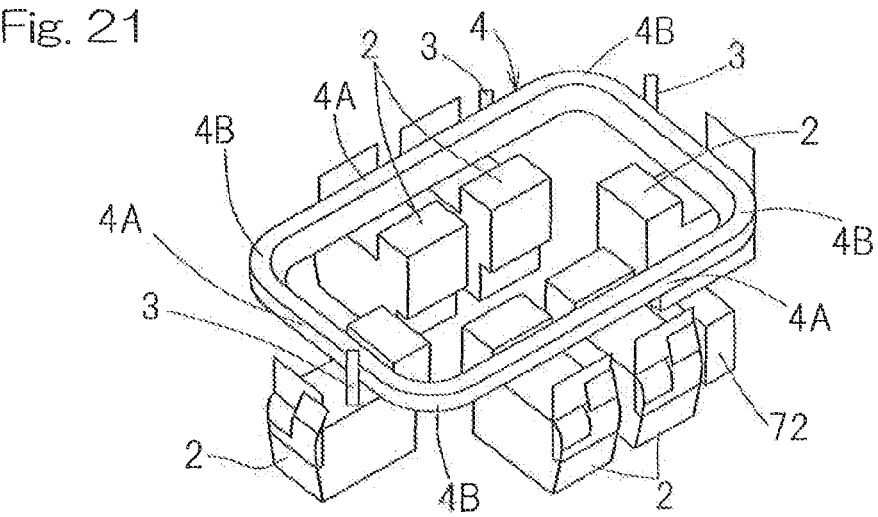
FIG. 21 is a perspective view of the conveyance system in accordance with a fifth preferred embodiment of the present invention.

In the practice of the fifth preferred embodiment shown in FIG. 21, in a manner similar to that shown and described in connection with the fourth preferred embodiment with reference to FIG. 20, the travel guide 4 preferably has a ring shape, but the travel guide 4 preferably has a rectangular ring shape in the fifth preferred embodiment. Specifically, two machine tools 2 are preferably arranged at respective positions of the two rectilinear sections 4A, which occupy respective long sides of the rectangular shape, and one machine tool 2 is disposed at respective positions of the two rectilinear sections 4A which occupy respective short sides of the rectangular shape. Also, three traveling members 3 are preferably disposed on the single travel guide 4 so that those traveling members 3 can be independently driven and/or perform other operations. Other structural features are similar to those provided in the previously described fourth preferred embodiment shown in FIG. 20.

Figure 22:
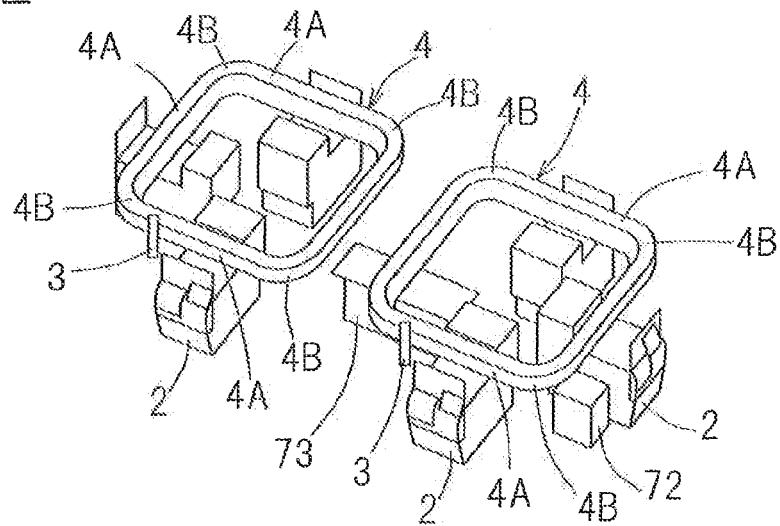
FIG. 22 is a perspective view of the conveyance system in accordance with a sixth preferred embodiment of the present invention.

In the practice of the sixth preferred embodiment shown in FIG. 22, two conveyance systems, each having a ring shape similar to that in the previously described fourth preferred embodiment shown in FIG. 20, are disposed in side by side relation to each other, and one transfer table 73 is disposed over respective positions of the rectilinear sections 4A of those two conveyance systems. The transfer table 73 is preferably defined by a conveyor or a device arranged to circulate pallets. In this case, the work can be delivered and received between those conveyance systems. Other structural features and effects are similar to those provided in the previously described fourth preferred embodiment shown in FIG. 20.

Figure 23A:
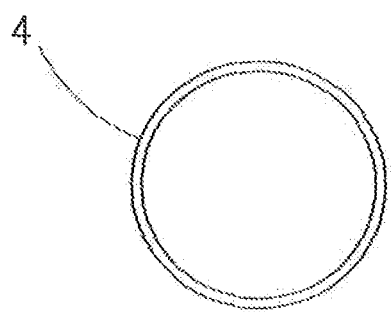
FIG. 23A is a top plan view showing a transport guide included in the conveyance system according to the seventh preferred embodiment of the present invention.
Figure 23B:
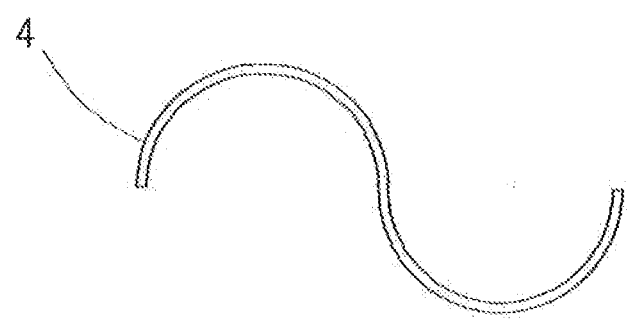
FIG. 23B is a top plan view showing the transport guide included in the conveyance system according to an eighth preferred embodiment of the present invention.
Figure 23C:
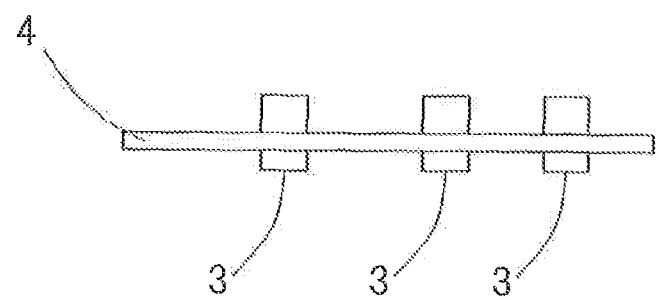
FIG. 23C is a top plan view showing the transport guide included in the conveyance system according to a ninth preferred embodiment of the present invention.

The seventh preferred embodiment shown in FIG. 23A is an example in which the travel guide 4 preferably has a torus shape and includes only an arcuately curved section. The eighth preferred embodiment shown in FIG. 23B is an example in which the travel guide 4 is preferably shaped so as to represent a shape similar to the shape of the figure "S" and includes arcuately curved sections. The ninth preferred embodiment shown in FIG. 23C is an example, in which the travel guide 4 is preferably shaped so as to represent a rectilinear shape and includes only a rectilinear section and, at the same time, a plurality of traveling members 3 are disposed on the common travel guide 4. Even where the travel guide 4 is constructed as in each of the seventh to ninth preferred embodiments shown in FIGS. 23A to 23C, effects similar to those hereinbefore described can be obtained. Other structural features and effects in each of the respective preferred embodiments shown in FIGS. 23A to 23C are similar to those afforded by the previously described fourth preferred embodiment shown in FIG. 20.

It is to be noted that in describing the various preferred embodiments of the present invention, use has been made of the non-contact power feeding device 41, for example. However, the electric power supply may alternatively be made with the use of a trolley system (not shown) instead of the non-contact power feeding device 41. Also, although in describing the various preferred embodiments of the present invention, reference has been made to the conveyance of the work W relative to the machine tool 2, the present invention can be equally applied to the conveyance of any article in the industrial machine and/or the physical distributing machinery. Although in describing the various preferred embodiments of the present invention one to three traveling members 3 that are to be mounted on the travel guide 4 have been described, the number of the travelling members 3 may alternatively be four or more.

In addition, although different from the preferred embodiments of the present invention, the curved section 4B of the travel guide 4 may also be used merely for travelling with no delivering and receiving device provided. Furthermore, even where the travel guide 4 is defined by only the rectilinear section 4A, various advantages can be obtained when the control is made by way of the non-contact power feeding and/or the wireless communication.

Although the preferred embodiments of the present invention have been fully described in connection with reference to the accompanying drawings, which are used only for the purpose of illustration, those of ordinary skill in the art will readily conceive numerous changes and modifications within the framework of obviousness upon the reading of this description. Accordingly, such changes and modifications are to be construed as included therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

REFERENCE NUMERALS

1 . . . Transport apparatus
2 . . . Machine tool
3 . . . Traveling member
3A . . . Traveling member main body
4 . . . Travel guide
4A . . . Rectilinear section
4B . . . Curved section
4u . . . Wheel guide face
5 . . . Linear motor
6 . . . Individual motor
6U, 6V, 6W . . . Electrode
7 . . . Mover
8 . . . Individual motor drive device unit (Travelling control unit)
10 . . . Multiple unit controller
12 . . . Frame
14 . . . Current detecting unit
15 . . . Sensor (Magnetic pole sensor)
15a . . . Sensor element
16 . . . Anteroposterior movable carriage
16a, 17a, 19a . . . Drive source
17 . . . Lifter
18 . . . Work holding head
19 . . . Chuck (Holding unit)
20 . . . Moving mechanism
21 (21i, 21o) . . . Travelling wheel
29 . . . Magnet for position detection
41 . . . Non-contact power feeding device
42 . . . Electric power supplying unit
43 . . . Electric power receiving unit
47 . . . Wireless communicating unit
48 . . . Command transmitting unit
49 . . . Control device
49a . . . Wireless communicating unit
W . . . Work or Workpiece (Article)

What is claimed is:

1. A conveyance system comprising:
a traveling member to transport an article and move along a travel guide;
a drive source to drive the traveling member and including a linear motor; wherein the linear motor includes:
a plurality of independent armatures on a primary side, arranged along the travel guide; and
a mover on a secondary side installed on the traveling member; and
the travel guide includes at least a curved section;
the traveling member is arranged to move along the curved section;
the plurality of independent armatures of the linear motor are spaced at a distance from each other over an entire travel path of the traveling member;
the traveling member includes a holding unit to hold the article and a moving mechanism to move the holding unit in a direction different from a traveling direction of the traveling member;
the conveyance system further comprises:
an electric power supplying unit provided along the travel guide;
an electric power receiving unit provided in the travelling member;
a non-contact power feeding device to feed on a non-contact basis to the electric power receiving unit from the electric power supplying unit; and
an electrically operated drive source defining a drive source for the holding unit and the moving mechanism; and
the traveling member is connected with the electric power receiving unit.

2. The conveyance system as claimed in claim 1, wherein the traveling member delivers the article to an article delivery destination positioned in the travel guide.

3. The conveyance system as claimed in claim 1, wherein the traveling member delivers the article onto a machine tool disposed along the travel guide.

4. The conveyance system as claimed in claim 1, wherein the plurality of armatures on the primary side are arranged along the curved section of the travel guide.

5. The conveyance system as claimed in claim 1, further comprising:
a wireless communicating unit mounted on the traveling member; and
a command transmitting unit mounted on the traveling member to control the drive source of the holding unit and the moving mechanism in response to a signal communicated by the wireless communicating unit.

6. A conveyance system comprising:
a traveling member to transport an article and move along a travel guide;
a drive source to drive the traveling member and including a linear motor; wherein
the linear motor includes:
a plurality of independent armatures on a primary side, arranged along the travel guide; and
a mover on a secondary side installed on the traveling member; and
the travel guide includes at least a curved section;
the traveling member is arranged to move along the curved section;

the plurality of independent armatures of the linear motor are spaced at a distance from each other over an entire travel path of the traveling member;

the mover on the secondary side is a permanent magnet having N and S magnetic poles alternately arranged in a direction corresponding to a traveling direction of the traveling member; and the conveyance system further comprises:

a magnetic pole sensor provided in the traveling member to detect the magnetic pole of the mover or the magnetic pole of a magnet provided in the traveling member in a same array as magnetic poles of the mover; and a travel control unit to perform a travel control of the traveling member with the use of a detection signal of the magnetic pole sensor.

7. The conveyance system as claimed in claim 1, wherein the travel guide is arranged to accommodate a plurality of traveling members mounted thereon.

8. The conveyance system as claimed in claim 6, wherein the traveling member delivers the article to an article delivery destination positioned in the travel guide.

9. The conveyance system as claimed in claim 6, wherein the traveling member delivers the article onto a machine tool disposed along the travel guide.

10. The conveyance system as claimed in claim 6, wherein the plurality of armatures on the primary side are arranged along the curved section of the travel guide.

11. The conveyance system as claimed in claim 6, wherein the travel guide is arranged to accommodate a plurality of traveling members mounted thereon.

\* \* \* \* \*